United States Patent

Mangum et al.

[11] Patent Number: 5,308,133
[45] Date of Patent: May 3, 1994

[54] TRUCK BED LINER AND FASTENING SYSTEM

[75] Inventors: Cody Mangum, St. George; Richard D. Rowland, Hurricane, both of Utah

[73] Assignee: LRV Acquisition Corporation, Wapakoneta, Ohio

[21] Appl. No.: 27,474

[22] Filed: Mar. 8, 1993

[51] Int. Cl.⁵ .................................................. B62D 33/00
[52] U.S. Cl. ................................... 296/39.2; 24/295; 24/563
[58] Field of Search ............... 296/39.2; 24/295, 563, 24/457

[56] References Cited

U.S. PATENT DOCUMENTS

| | | | |
|---|---|---|---|
| 3,170,714 | 2/1965 | Stalker | 280/727 |
| 3,495,758 | 2/1970 | Achermann et al. | 229/125.35 |
| 3,544,155 | 12/1970 | Gardner | 296/67 |
| 3,653,710 | 4/1972 | Barnard | 296/39.1 |
| 4,047,749 | 9/1977 | Lambitz et al. | 296/39.1 |
| 4,111,481 | 9/1978 | Nix et al. | 296/39.2 |
| 4,161,335 | 7/1979 | Nix et al. | 296/39.2 |
| 4,181,349 | 1/1980 | Nix et al. | 296/39.2 |
| 4,245,863 | 1/1981 | Carter | 296/39.2 |
| 4,253,785 | 3/1981 | Bronstein | 410/110 |
| 4,333,678 | 6/1982 | Munoz et al. | 296/39.2 |
| 4,336,963 | 6/1982 | Nix et al. | 296/39.2 |
| 4,341,412 | 7/1982 | Wayne | 296/39.2 |
| 4,453,875 | 6/1984 | Johnson | 296/39.1 X |
| 4,540,214 | 9/1985 | Wagner | 296/39.2 |
| 4,572,568 | 2/1986 | Kapp et al. | 296/39.2 |
| 4,575,146 | 3/1986 | Markos | 296/39.2 |
| 4,595,229 | 6/1986 | Wagner | 296/39.2 |
| 4,659,133 | 4/1987 | Gower | 296/39.2 |
| 4,740,026 | 4/1988 | Wagner | 296/39.2 |
| 4,768,822 | 9/1988 | Gower | 296/39.2 |
| 4,796,942 | 1/1989 | Robinson et al. | 296/39.2 |
| 4,906,040 | 3/1990 | Edwards | 296/39.2 |
| 5,046,775 | 9/1991 | Marcum, Jr. et al. | 296/39.2 |
| 5,100,193 | 3/1992 | Oprea et al. | 296/39.2 |
| 5,150,940 | 9/1992 | Kennedy | 296/39.2 |

*Primary Examiner*—Robert R. Song
*Attorney, Agent, or Firm*—Dinsmore & Shohl

[57] ABSTRACT

A combination truck bed liner and fastening system for truck beds having one or more substantially vertical bed sidewalls and a front wall having a top rail with an outwardly facing lip. The combination includes a truck bed liner having a floor and integrally attached side and front walls extending upwardly therefrom to upper edges, and at least one slot formed adjacent that upper edge. At least one resilient snap-type clip having a hook end and stay end is provided, wherein compressive force is applied between the hook and stay ends in use by the inwardly biased nature of the clip. In attached condition, the hook end of the clip extends outwardly to lockingly overlie the truck bed rail, while the stay end overlies at least a portion of the upper edge of the liner and includes an outwardly protruding stay which interacts with the recess in the truck bed liner. As a result, the clip is compressively fitted over the upper edge of the liner and the rail to hold the liner in place without a need for drilling.

20 Claims, 2 Drawing Sheets

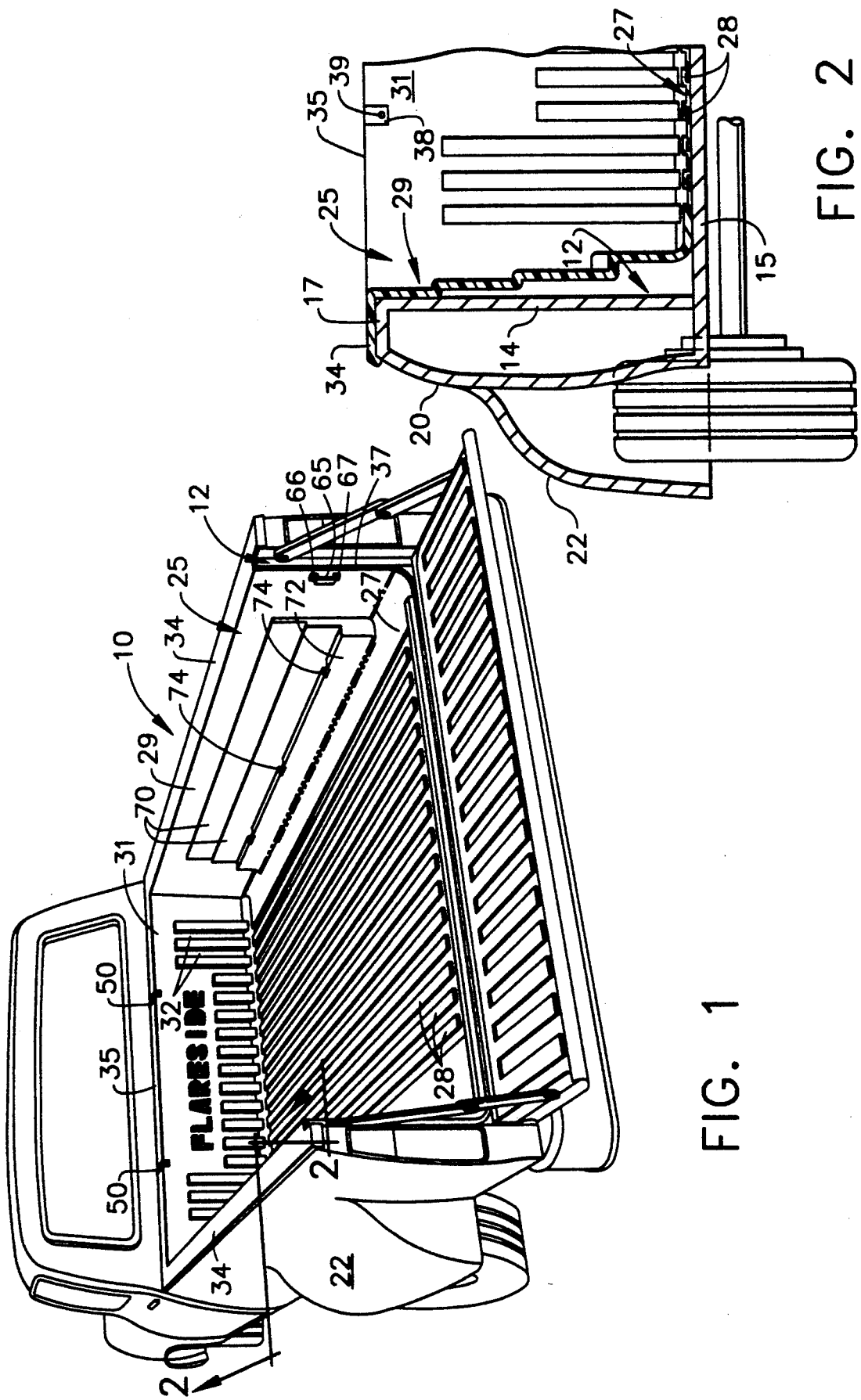

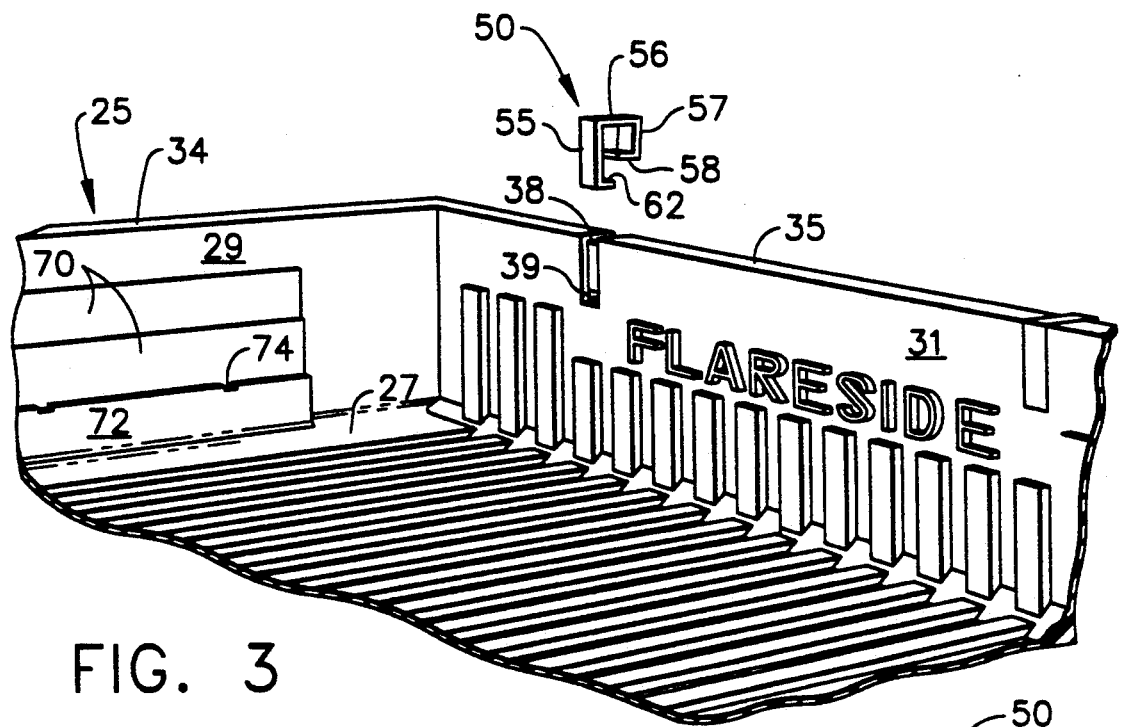
FIG. 3
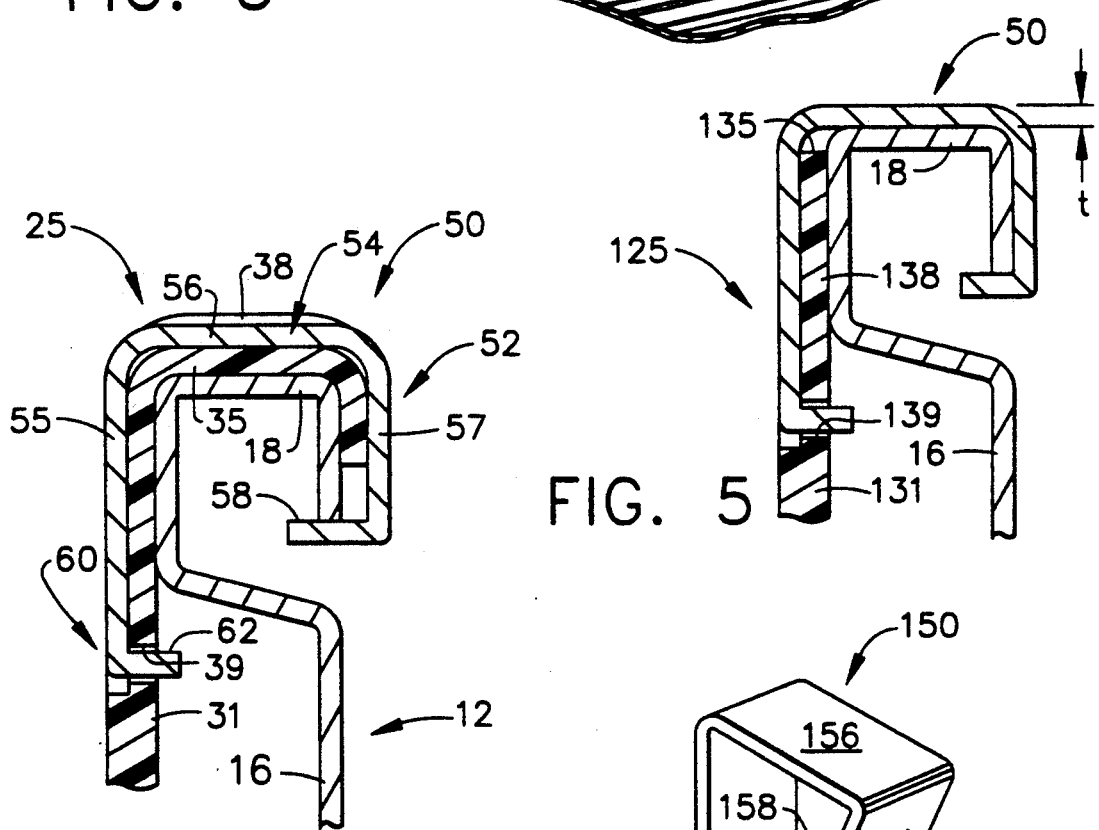
FIG. 4
FIG. 5
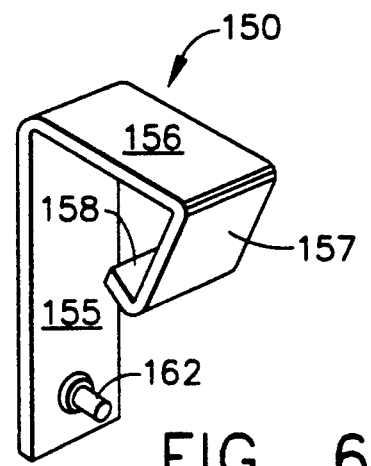
FIG. 6

TRUCK BED LINER AND FASTENING SYSTEM

TECHNICAL FIELD

This invention pertains to protective truck bed liners and attachment arrangements for such liners, and, more particularly, to a new truck bed liner and fastening system featuring a snap-type retainer clip designed to compressively overlie at least a portion of the upper edge of the liner and to lockingly overlie the truck bed rail to provide for non-drilling or "drilless" installation and substantially flush fastening of the liner along the truck bed rail.

BACKGROUND ART

A variety of molded plastic truck bed liners have been known and available in the automotive industry for quite some time, as exemplified in U.S. Pat. Nos. 3,814,473 (issued to Lorenzen on Jun. 4, 1974); 3,881,768 (issued to Nix on May 6, 1975); and 4,181,349 (issued to Nix et al. on Jan. 1, 1980). Along with truck bed liners of varying design and application, there have also been provided a variety of fastening structures to insure that the liners are retained within the truck bed during use. For example, the Nix et al. '349 patent mentioned above discusses various types of fastening means which may be employed to secure the liner to the truck bed, and, particularly, illustrates a preferred toggle bolt fastener which can be inserted through pre-existing holes in the top flange of the truck bed sidewalls.

Other examples of fastening arrangements for truck bed liners are shown in U.S. Pat. Nos. 4,740,026 (which issued to Wagner on Apr. 26, 1988), 4,595,229 (which issued to Wagner on Jun. 17, 1986), 4,796,942 (which issued to Robinson, et al. on Jan. 10, 1989), 4,659,133 (which issued to Gower on Apr. 21, 1987), and 4,768,822 (which issued Gower on Sept. 6, 1988). These patents each disclose and illustrate various attachment structures which extend through portions of the liner walls for selective interaction with the downturned inner portion of the truck bed sidewall. The Gower '133 patent also shows a J-shaped retaining device which includes adhesive material, and which is designed to slip over the upper edge of the liner sidewall and to be adhesively adhered for engagement with the truck bed ledge wall. Each of these devices, however, further requires manipulation of bolts or screws for tightening the devices in place, or the requirement for the removal of adhesive coverings and careful placement of J-shaped hooks.

An improved snap-lock fastener for truck bed liners is shown in U.S. Pat. No. 5,046,775 (which issued to Howard Marcum et al. on Sep. 10, 1991). This fastening device conveniently snaps into a preformed aperture in the liner sidewall to mechanically interact with the rail structure of the truck bed to secure the liner in place without requiring drilling or complex attachment devices. This snap lock fastener is also easily adaptable to a variety of installation applications, and mounts substantially flush with the walls of the truck bed liner so as not to interfere with the full use of the liner.

Additionally, a number of new pickup truck bed designs include additional inner panel structures which make the inwardly extending flange or rail structure required for the presently available "drilless" anchoring means (and some of the snap-type fastening systems) inaccessible. Similarly, many new truck bed designs also eliminate the stake pockets commonly found along the top edges of the truck bed side walls, and which were sometimes used to accommodate toggles or other bed liner fastening devices. Some of the newer truck styles have eliminated the inwardly extending wheel wells and provide sidewalls which are substantially vertical from bottom to top. A number of these designs also include an inwardly extending tie-down bar near the rear portions of each sidewall to facilitate the attachment of tie-down ropes and the like. Because the previous fastening systems requiring some kind of truck bed rail or flange are not applicable or adaptable to many of the new truck bed designs, a new liner and fastening system was needed.

DISCLOSURE OF THE INVENTION

It is an object of this invention to provide a combination truck bed liner and fastening system which provides an improved truck bed liner which can be quickly and securely fastened within a truck bed having substantially vertical side and front walls without inwardly extending upper rail portions and stake pockets.

It is another object of the present invention to provide a combination truck bed liner and fastening system which can be quickly installed into truck bed having no inwardly extending flange or rail structure without a need for additional drilling or complex attachment devices.

It is yet another object of the present invention to provide a combination liner and fastening system which includes one or more resilient snap-type clip fasteners to provide secure compressive attachment of the upper of the bed liner to the truck bed and which can overlie a portion of the truck bed rail in substantially flush condition.

It is also an object of the present invention to provide a combination truck bed liner and fastening system which features the use of one or more snap-type clips which lockingly overlie the truck bed head rail or front rail, and one or more tie-down bars connected directly to the truck bed side wall for securely holding the truck bed liner in place.

In accordance with one aspect of the present invention, there is provided a combination truck bed liner and fastening system for truck beds having one or more substantially planar bed walls and a front wall having a top rail with an outwardly facing lip. The combination includes a truck bed liner having a floor and integrally attached substantially planar side and front walls extending upwardly therefrom to upper edges, and at least one recess formed adjacent that upper edge. At least one resilient snap-type clip having a hook end and stay end is provided wherein compressive force is applied between the hook and stay ends in use by the inwardly biased nature of the clip. In use, the hook end of the clip extends outwardly to lockingly overlie the truck bed rail, while the stay end overlies at least a portion of the upper edge of the liner and includes a protruding stay which interacts with the recess in the truck bed liner. As a result, the clip is compressively fitted over the upper edge of the liner and the rail to compressively hold the liner in place.

In a preferred embodiment, a pair of snap-type clips are provided along the upper edge of the front wall of the truck bed liner, while a pair of tie-down bars are substituted for the original equipment tie-down bars near the rear open portion of the truck bed. These tie-down bars are attached to the truck bed sidewall through the liner sidewalls, and both augment the fastening of the liner to the truck and allow attachment of tie-down ropes and the like.

The upper edge of the front wall of the truck bed liner is also preferably provided with a pair of recessed clip retainer areas having a depression to receive the protruding stay of the clip. In this way, the clips can be received in locking position in substantially flush arrangement with the front rail of the truck bed.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

FIG. 1 is a rear perspective view of a truck bed liner and fastener system made in accordance with the present invention and shown in installed condition in a truck bed;

FIG. 2 is a partial, vertical cross-sectional view of the truck bed and liner system of FIG. 1, taken along line 2—2 thereof;

FIG. 3 is a partial, enlarged perspective view of the front portions of a preferred embodiment of a truck bed liner and fastening system made in accordance herewith, illustrating the snap-type anchor clips and recesses in detail;

FIG. 4 is a partial, vertical cross-sectional view showing the anchor clip 50 in its locked condition over a liner extending over the top portions of a truck bed front rail;

FIG. 5 is a partial cross-sectional view of an anchor clip of the present invention, shown in locked condition with the upper edge of a truck bed liner which does not extend over the rail of the truck bed; and FIG. 6 is a perspective view of an alternate embodiment of an anchor clip made in accordance with the present invention.

DETAILED DESCRIPTION OF THE INVENTION

Referring now to the drawings in detail wherein like numerals indicate the same elements throughout the views, FIG. 1 illustrates a preferred truck bed liner and fastening system 10 made in accordance with the present invention and installed within a truck bed 12. As best seen in FIGS. 1, 2 and 4, truck bed 12 is illustrated as comprising a floor 15 having peripherally spaced and substantially vertical sidewalls 14 and front wall 16 which do not include inwardly extending rail portions or flanges.

As illustrated in FIGS. 1 and 2, a number of truck beds provided with outwardly spaced rear wheels do not include the inwardly (i.e., inwardly into the bed area) protruding wheel wells often found in the sidewalls of truck beds heretofore. In contrast, top rail 17 of truck bed 12 extends outwardly and is generally integrated with the exterior body 20 of the truck. As will be understood, because the front wall of the truck bed is generally segregated from the truck cab, there is often an outwardly extending flange, lip or head rail 18 oriented forwardly of the upper portions of front wall 16 of truck bed 12 (as best seen in FIG. 4). An outwardly extending wheel well 22 covers the outwardly spaced rear wheel, as seen best in FIGS. 1 and 2. The result is a lined truck bed having a substantially uniform, unencumbered rectangular lined cargo space with substantially vertical side and front end liner walls.

The truck bed liner 25 of the present invention generally comprises a liner floor 27, a pair of upwardly extending liner sidewalls 29, and liner front wall 31 integrally formed therewith. As illustrated in the figures, liner floor 27 and front wall 31 preferably include a plurality of spaced rib structures 28 and 32, respectively. Upper edges 34 and 35 are preferably designed to follow the contour of the top rail 17 of the truck bed in applications where protection of that surface by the liner is desired.

As best seen in FIGS. 2-4, at least a pair of anchor recesses 38 are formed adjacent the upper edge 35 (and upper edge 135 of liner 125 shown in FIG. 5). It is contemplated that anchor recess 38 will be of sufficient size and depth to easily accommodate an anchor clip (e.g., clip 50) in a countersunk manner such that an attached clip will be substantially flush with top rail 17 of front wall 16 of the truck bed liner. As best seen in FIGS. 3-6, it is contemplated that the anchor clip of the present invention (e.g., clip 50, 150) will preferably be provided in the form of a one-piece substantially flat or ribbon-like structure which might be manufactured from spring-type steel. In some applications, recess 38 may not extend downwardly onto the front wall 31. Particularly, due to the relatively flat nature of the preferred construction of clip 50, such extended recess may not be necessary as clip 50 will snugly conform to the flat surface of front wall 31 in most instances.

Clip 50 is illustrated as including a generally U-shaped body 54 comprising a hook end 52 and a stay end 60. Body 54 further comprises a longitudinal base member 55 connected at its upper end to top flange 56, which in turn in connected to front face 57 and its inwardly turned locking finger 58. Adjacent stay end 60, there is provided an outwardly protruding stay or protuberance 62. Clip 50 also comprises means for providing inward compressive or clamping force between hook end 52 and stay end 60 in use. As best seen in FIGS. 3 and 6, it is further preferred that clip 50 (or 150) will be formed with a normally inwardly biased characteristic by preforming base member 55 (155) and the front face 57 (157) in a non-parallel, inwardly oriented manner. In this way, the inherent flexibility of the resilient snap-type clip 50 will provide the required compressive force between hook end 52 and stay end 60 when expanded in use. As will be understood, the resulting compressive force can be predetermined and adjusted by appropriate choice of materials, degree of preformed bias, the specific means used to provide such force, and in other ways known in the art.

Once truck bed liner 25 is placed within truck bed 12 with its front wall 31 closely adjacent front wall 16 of bed 12, an anchor clip 50 can be preliminarily aligned with anchor recess 38 and with its locking finger 58 wrapped around and underlying the front-most lower edge of lip or head rail 18 of the top rail of front wall 16. Thereafter, clip 50 is pushed downwardly into anchor recess 38 until protuberance 62 of clip 50 is received within a detent recess or slot 39, which is molded into the lower portions of anchor recess 38 in the liner. Recess 39 can be a slot extending through the liner structure (as seen in FIG. 4), or may be merely an appropriate depression or recess designed to lockingly receive stay or protuberance 62 of clip 50.

As will be understood, as anchor clip 50 is pushed downwardly into recess 38, base member 55 is forced outwardly from its initial orientation with respect to front face 57, thereby increasing the resultant compressive forces between the hook end 52 and stay end 60 of the clip. As the clip is pushed into its locked condition (shown in FIG. 4), protuberance 62 is lockingly received within detent recess 39 in a snap-like fashion. Additionally, anchor clip 50 will be received within recess 38 such that it is at least substantially flush or slightly recessed with respect to the surrounding bed liner surfaces. In this way, clip 50 will remain in locked condition and will be substantially protected from interference or interaction with surrounding structures and/or cargo within the truck bed.

As will be clear to those or ordinary skill in the art, locking finger 58 provides leverage to clip 50 as it is snapped into locked condition, ensuring a snug compressive clamping action, whereby clip 50 acts to hold the truck bed liner in proper position, both vertically within the truck bed, and snugly against the truck bed walls. In this regard, locking finger 58 extends partially under top rail or lip 18 to positively anchor clip end 52 of clip 50, while stay end 60 is rotated into its compressive locked condition, as described. The resulting compressive forces of clip 50 tend to hold upper edge 35 upwardly and against the corresponding truck bed wall. Some truck bed front walls (e.g., 16) include an undercut as best seen in FIG. 4, which allows protuberance 62 to pass through liner wall 31, in locked condition with no concern of interference.

As best illustrated in FIG. 5, it is not critical that truck bed liner 25 include upper edges (e.g., 34 and 35) which extend onto and over portions of top rail 17 of the truck bed. For example, in some applications, where it is desired to attach a truck cap above the truck bed, it may be preferred that the truck bed liner not extend onto the top rail 17 of the truck bed. In such case, the present liner and fastening system combination can still be utilized, with anchor clip 50 snapping into substantially flush, locked condition with respect to the upper surfaces of lip 18 of the top rail.

Particularly, it is contemplated that when clip 50 is provided in the form of a ribbon-like unitary piece of spring steel or the like, the thickness "t" of the clip can be relatively small (e.g., 0.1 mm). As seen in FIG. 5, it is still preferred to provide an anchor recess 138 adjacent upper edge 135 of front wall 131 to receive and help maintain anchor clip 50 in its locked condition. Similarly, detect recess 139 is provided adjacent the lower end of recess 138 to receive the outwardly extending protuberance 62. The same multi-directional compressive forces will be provided by clip 50 to hold and maintain liner 125 upwardly in place and against the truck bed wall (e.g., wall 16) in the manner described above.

Anchor clip 150 illustrated in FIG. 6 is substantially similar to anchor clip 50 described above, with the exception that its protuberance is provided in the form of a tapered bottom or pin 162, as opposed to the outwardly extending flange 62 of clip 50. Clip 150 is shown merely as an example to illustrate the fact that the clip of the present invention can be provided in a variety of structural configurations, as appropriate. While the clip may preferably take the form of a unitary piece of preformed spring-type steel, other resilient material such as plastics, carbon fiber and the like could be equally substituted. Similarly, it is preferred that anchor clips made in accordance herewith be provided with weather resistant characteristics, either by the material itself, or by appropriate coatings, treatments or the like.

As can also be seen in FIG. 1, a tie-down bar 65 is preferably provided for attachment adjacent the rear, open section of truck bed 12. Particularly, it is contemplated that a pair of spaced holes 66 will be provided adjacent the rear edge 37 of truck bed liner 25. In many truck beds having substantially vertical sidewalls, there is provided a pair of tie-down members mounted near the rear of the truck bed by a pair of vertically spaced bolts. Holes 66 are provided in truck bed liner 25 to correspond with and align with those original tie-down bolts. Prior to installation of liner 25, the originally installed tie-down bars are removed. Thereafter, liner 25 is installed in truck bed 12 and tie-down bar 65 is attached through holes 66 and liner sidewall 29 and secured via a pair of bolts 67. Bolt 67 can preferably be the original tie-down bolts often provided on the truck bed as delivered from the factory, but it is preferred to replace the "original equipment" tie-down bar with a slightly larger bar 65 which extends further inwardly within the installed liner 25 to facilitate attachment of tie-down ropes and the like.

Once installed, tie-down bar 65 helps retain liner 25 against movement relative to truck bed 12 in use. A pair of tie-down bars 65 will generally be provided, one on either side of the truck bed liner. In combination with one or more anchor clips 50, as described above, this tie-down bar arrangement provides an extremely convenient and secure fastening system for liner 25 without requiring additional drilling or complex fastening arrangements.

As seen in FIGS. 1-3, liner 25 can further be provided with one or more longitudinal panels (e.g., 70 and 72) along liner sidewalls 29. In order to provide the capability of tiered cargo stacking, it is also preferred that a plurality of corresponding pairs of cross-support recesses 74 be located along at least one of the longitudinal panels (e.g., along the upper edge of lower panel 72). Cross-support members (not shown) such as 2×4 wood members or the like can thereby be transversely inserted between corresponding recesses for supporting additional cargo and/or an overlying cargo support member, such as plywood or the like.

Having shown and described the preferred embodiments of the present invention, further adaptions of the bed liner and fastening system of the present invention can be accomplished by appropriate modifications by one of ordinary skill in the art without departing from the scope of the present invention. Several of such potential modifications have been mentioned, and others will be apparent to those skilled in the art. For example, while the present liner and fastening system has been described for use in truck beds without inwardly extending wheel well housing structures, it is contemplated that this system is equally adaptable to all types of truck bed applications, including those with such wheel wells. Accordingly, the scope of the present invention should be considered in terms of the following claims and is understood not to be limited to the details of structure and operation shown and described in the specification and drawings.

We claim:

1. A combination truck bed liner and fastening system for truck beds having a front wall with a top rail with an outwardly facing lip, said combination comprising:

a truck bed liner having a floor, upstanding side walls, and a substantially planar front wall extending upwardly from said floor to upper edges, and at least one recess formed adjacent an upper edge of said front wall; and at least one resilient snap-type clip having a hook end and a stay end and means for providing compressive force between said ends, said hook end extending outwardly to lockingly overlie said top rail, and said stay end overlying at least a portion of said upper edge adjacent said liner front wall and having an outwardly protruding stay which interacts with said recess in said truck bed, wherein said clip is compressively fitted over said upper edge and said rail to fasten said bed liner in place within said truck bed.

2. The combination of claim 1, wherein said truck bed liner further includes top portions which overlie at least a portion of said truck bed rails in use, and wherein said hook end of said clip extends outwardly to overlie said top portions.

3. The combination of claim 1, wherein said stay comprises an outwardly extending flange oriented at an angle with said stay end of the clip.

4. The combination of claim 1, wherein said stay comprises an outwardly extending protuberance designed to lockingly interact with a corresponding recess formed in said bed liner adjacent said upper edge.

5. The combination of claim 4, wherein said recess is formed in said front wall.

6. The combination of claim 1, wherein said hook end includes a locking finger which underlies a portion of said lip of said top rail in use.

7. The combination of claim 1, wherein said clip is a one-piece structure.

8. The combination of claim 7, wherein said clip comprises a ribbon-like piece of spring-type steel.

9. The combination of claim 1, further comprising a tie down member attached to at least one of the truck bed side walls through the corresponding liner sidewall, thereby further fastening said liner in place.

10. A resilient snap-type retainer clip for use in clamping a truck bed liner in a truck bed having one or more substantially planar bed walls with rails featuring outwardly facing lips, said liner having a floor, and substantially planar side and front walls extending upwardly from said floor to upper edges, and at least one recess formed adjacent the upper edge of the liner front wall, said retainer clip comprising a hook end and a stay end and means for providing compressive force between said ends, said hook end extending outwardly to lockingly overlie said truck bed rail, and said stay end overlying at least a portion of said upper edge adjacent said liner front wall and having an outwardly protruding stay which interacts with said recess in said truck bed liner, wherein said clip is compressively fitted over said upper edge and said rail.

11. The combination of claim 10, wherein said stay comprises an outwardly extending flange oriented at an angle with said stay end of the clip.

12. The combination of claim 10, wherein said stay comprises an outwardly extending protuberance designed to lockingly interact with a corresponding recess formed in said bed liner adjacent said upper edge.

13. The combination of claim 12, wherein said recess is formed in said front wall.

14. The combination of claim 10, wherein said hook end includes a locking finger which underlies a portion of said lip of said top rail in use.

15. The combination of claim 10, wherein said clip is a one-piece structure.

16. The combination of claim 15, wherein said clip comprises a ribbon-like piece of spring-type steel.

17. The combination of claim 10, further comprising a tie down member attached to at least one of the truck bed side walls through the corresponding liner sidewall, thereby further fastening said liner in place.

18. A combination truck bed liner and fastening system for truck beds having one or more side walls with top rails, and a front wall with a top rail with an outwardly facing lip, said combination comprising:

a truck bed liner having a floor, side and front walls extending upwardly from said floor to upper edges, a substantially open rear portion, and at least one recess formed adjacent the upper edge of said front wall;

at least one resilient snap-type clip having a hook end and a stay end and means for providing compressive force between said ends in use, said hook end extending outwardly to lockingly overlie said truck bed rail, and said stay end overlying at least a portion of said upper edge and having an outwardly protruding stay which interacts with said recess wherein said clip is compressively fitted over said upper edge and said rail; and at least one tie down member fastened to a side wall adjacent the rear portion of said liner, said tie down member further holding said bed liner against movement relative to said bed after installation.

19. The combination of claim 18, further comprising a pair of tie down members, each being attached to a different one of said bed side walls through respective side walls of said bed liner.

20. The combination of claim 19, wherein said tie down members comprise rod-like members having a curved section which extends inwardly within said truck bed in use to receive ropes and the like to secure cargo within said bed, and wherein said curved section provides clearance between said tie down member and the side wall of said liner.

* * * * *